Sept. 18, 1923.
E. H. ANGIER
BALE
Filed July 6, 1918
1,468,130
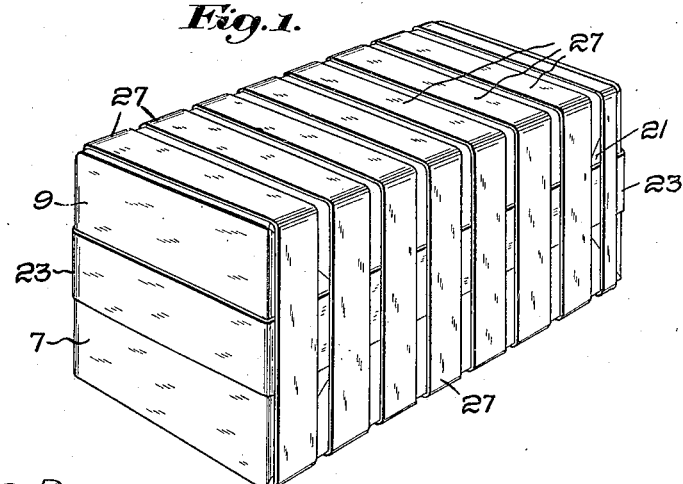
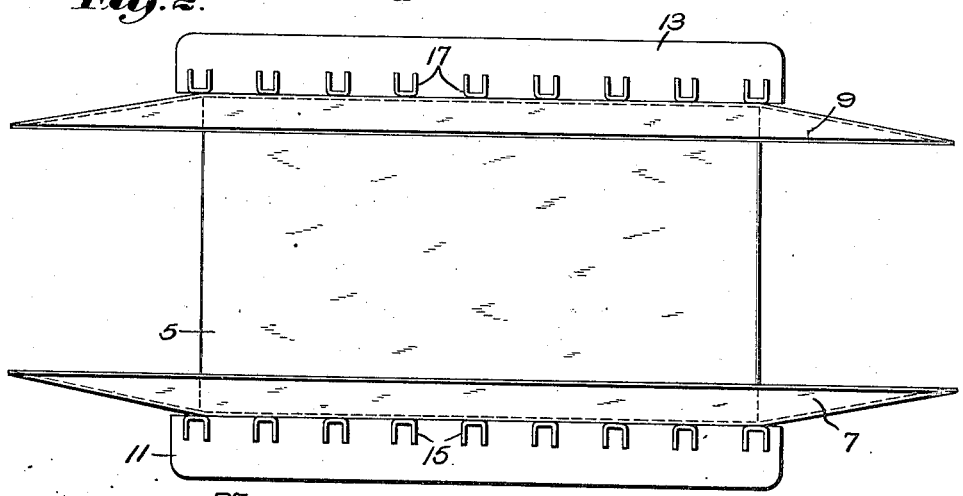
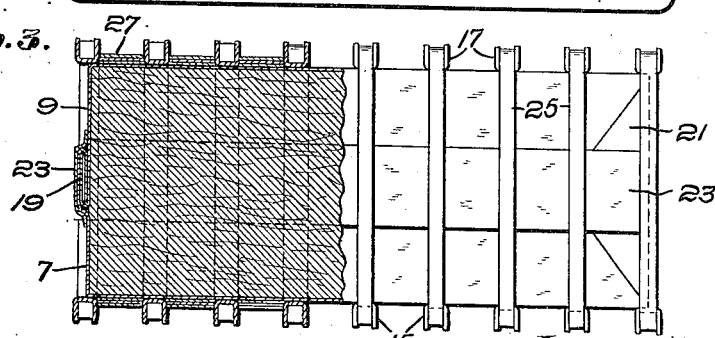

Patented Sept. 18, 1923.

1,468,130

UNITED STATES PATENT OFFICE.

EDWARD H. ANGIER, OF FRAMINGHAM, MASSACHUSETTS.

BALE.

Application filed July 6, 1918. Serial No. 243,515.

*To all whom it may concern:*

Be it known that I, EDWARD H. ANGIER, a citizen of the United States, and a resident of Framingham, in the county of Middlesex and State of Massachusetts, have invented an Improvement in Bales, of which the following description, in connection with the accompanying drawings, is a specification, like characters on the drawings representing like parts.

This invention relates to bales and the object is to provide as a unit for shipment or storage a bale enclosed in a wrapping of paper or similar flexible material which may contain a commodity under a high compression and which will thoroughly protect the enclosed commodity. In particular my invention aims to obviate the use of metal in preparing the bale and to provide a more durable package than has hitherto been possible.

My invention will best be understood by the following description of the illustrative embodiment shown in the accompanying drawings wherein:

Figure 1 is a perspective view of the completed bale;

Fig. 2 is a side elevation showing a preliminary stage in the preparation of the bale; and Fig. 3 is partly a section and partly a side elevation showing the bale at an intermediate stage of its preparation.

The nature of my invention may best be understood by a brief description of the manner in which the bale is prepared and I will therefore first refer to Fig. 2 wherein I have indicated the material about to be compressed to form the bale by the numeral 5. The material may be assembled with suitable covering sheets 7 and 9 and subjected to compression between opposed press members 11 and 13, any suitable removable baling form (not shown) being utilized if desired. The sheets 7 and 9 are preferably waterproof, a suitable material being that shown in Patent No. 1,269,140 dated June 11, 1918, to William Wheildon. The material is herein shown as compressed between sets of bars 15 and 17 which are conveniently rigid bars and which may be, as shown, inset in the press members 11 and 13 so as to provide substantially continuous surfaces between which the material 5 is compressed. After the material has been subjected to the desired degree of compression, as indicated in Fig. 3 by the lesser height thereof as compared to Fig. 2, the sheets 7 and 9 may be folded over the sides of the same and may conveniently be connected, as herein shown, by a rolled joint 19 across the ends of the bale. The fullness of the sheets at the corners may be gathered into pleats 21. The two sheets may then be joined as by means of the adhesive sealing strip 23. The pairs of bars 15 and 17 are then conveniently connected across the sides of the bale as by means of the connecting bars 25 shown in Fig. 3 and the press members 13 and 15 may then be separated to release the bale which will then be retained under compression substantially as shown in Fig. 3 at the right hand portion thereof by means of rigid-sided encircling frames comprising the pairs of bars 15 and 17 connected by the bars 25.

The bale may then be completed by wrapping the spaces between adjacent frames with suitable flexible non-metallic material, preferably taking the form of band-like strips of a width adapted to extend between the frames. A reinforced paper band such as is shown in my Patent No. 1,167,466, dated Jan. 11, 1916, is suitable for use. Such a strip or band 27 is preferably sealed to the sheets 7 and 9 by suitable adhesive and wound round in a number of turns, as indicated at the left hand of Fig. 3, which turns are adhesively secured one to another. A compound tie is thus provided which provides both a resistance due to the number of turns, this resistance being similar to that of a rope which is belayed to a post, and a resistance due to the adhesive joint which is of a length one or more times the transverse perimeter of the bale, according to the number of turns of the strip 27. Thus a joint may be made by the use of adhesive which is of ample strength to maintain the material 5 under high compression.

When the adhesive has set the frames formed by the bars 15, 17 and 25 are removed and the completed bale will then appear substantially as in Fig. 1, the expansive strain of the compressed material 5 being taken up and resisted by the compound bands 27 as such.

Since the ties 27 are flexible, when the rigid frames formed by the bars referred to are removed the pressure on the ties will usually give the bale a gentle curvature from edge to edge. The comparatively great width of the bands, however, will maintain an even pressure on the material from end to end of the bale and prevent it from bulging irregularly between its ends. While my completed bale, as shown in Fig. 1, to an extent reverses the present practice in that the retaining ties formed by the strips 27 are comparatively broad, cover the major portion of its surface and are separated by relatively narrow spaces, it is my intention, nevertheless, to make the bars 15 and 17 of some width as distinguished from wire bale ties which would cut into the baled material and allow the bale to bulge between the ties before the strips 27 are applied. It will be noted by referring to Fig. 2 that in accordance with the method there shown the material is initially compressed between two substantially continuous surfaces so that initially there is no tendency for local bulging, and I conveniently form the bars 15 and 17 of such width as to maintain this compression without any substantial bulging of the material between them. The showing of the drawing is necessarily somewhat diagrammatic in view of the scale on which it has been necessary to illustrate the invention, but I prefer to space the bars regularly and to make them of such dimensions that the surface engaged by them will be from two to five tenths of the total length of the bale and may conveniently be in the neighborhood of one-third thereof. For example, in applying my invention to the baling of clothing for army use and for a bale 30" in length I may use bars an inch in width and spaced an inch and a half apart to receive a 1½" reinforced strip 27. In the completed bale, as shown in Fig. 1, the broad band-like strips will prevent any local bulging between them since from one-half to eight tenths, or conveniently in the neighborhood of two-thirds, of the material is held by the ties.

My invention provides a bale enclosed in a covering which preferably is waterproof and which does not require the use of metal which might cut the protective covering or injure other packages with which the bale might come in contact. The expansive tendency of the highly compressed material within the bale is resisted by the ties 27 as such, the sheets 7 and 9 being primarily merely covering sheets to provide a continuous, protecting surface. It will be understood that the joint provided by the strip 23 may be and ordinarily is of insufficient strength to resist, in itself, the expansive force of the material and the shocks of handling. My bale is thus distinguished from packages which are wound about with coverings whether in the form of a strip or otherwise and where these coverings are merely an additional binding at best merely reinforcing or supplementing the true compression maintaining elements.

The manner of applying the bindings is such that the covering sheets 7 and 9 are not harmed and because of their breadth and relatively close spacing they maintain a substantially uniform compression upon the baled material. It has hitherto often been attempted to cover baled material with paper sheets and hold the whole by metal bale ties of the usual character. Such ties were likely to cut the paper and the act of tensioning them by means of the usual tool was likely to result in puncturing the paper. With the ties 27, as here shown, the entire surface of the inner turn engages the commodity and the end of the tie is secured entirely exterior to such inner turn and nothing is pressed locally against the covering sheets 7 and 9 in such a way as to puncture the same. It has futhermore been found that when a paper covered bale was held in metal ties, the expansion of the bale in the comparatively wide spaces between the ties after compression was released would usually burst or crack the paper so that the package would be no longer waterproof. In the construction as here disclosed such bulging is eliminated or greatly minimized and there is little or no strain upon the covering sheets between adjacent ties.

Since the encircling bands 27 are sealed to the enclosing covering and are in effect merged into the same as an integral part thereof, the bands may be placed at or very near the end of the bale and there is no danger of their slipping off if the bale is temporarily deformed. The end of the bale is thus held in shape and permanently reinforced.

It will be understood that any further exterior wrapping may be applied if desired over the so-called completed bale as shown in Fig. 1.

Having thus described for purposes of illustration one form of my invention, the principles exemplified thereby which I claim as new and desire to secure by Letters Patent I shall express in the following claims:—

1. A bale comprising a commodity held under compression by ties comprising flexible non-metallic bands wound about the same in a plurality of superposed and adhesively connected turns.

2. A bale comprising a compressed commodity, a sheet-like covering for the same and encircling ties comprising flexible bands of non-metallic material encircling the bale in a plurality of turns adhesively secured one to another and to said covering.

3. A bale comprising a commodity held under compression by encircling, relatively broad bands closely spaced to provide a substantially uniform top and bottom face for the bale.

4. As a unit for shipment or storage, a bale comprising highly compressed material, an enclosing sheet and ties each comprising a band of flexible, non-metallic strip wound about the bale in a plurality of turns adhesively secured to each other and to said sheet, the expansive stress of the material directly tensioning and being resisted by said bands.

In testimony whereof, I have signed my name to this specification.

EDWARD H. ANGIER.